US010237566B2

(12) United States Patent
Zhu et al.

(10) Patent No.: US 10,237,566 B2
(45) Date of Patent: Mar. 19, 2019

(54) VIDEO DECODING USING POINT SPRITES

(71) Applicant: MICROSOFT TECHNOLOGY LICENSING, LLC, Redmond, WA (US)

(72) Inventors: Lihua Zhu, San Jose, CA (US); Guosheng Sun, San Jose, CA (US); B Anil Kumar, Saratoga, CA (US); Shir Aharon, Mountain View, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 386 days.

(21) Appl. No.: 15/089,310

(22) Filed: Apr. 1, 2016

(65) Prior Publication Data

US 2017/0289547 A1 Oct. 5, 2017

(51) Int. Cl.
*H04N 19/42* (2014.01)
*H04N 19/43* (2014.01)
*H04N 19/436* (2014.01)

(52) U.S. Cl.
CPC ........... *H04N 19/42* (2014.11); *H04N 19/436* (2014.11)

(58) Field of Classification Search
CPC .............................. H04N 19/42; H04N 19/436
USPC .................................................... 375/240.01
See application file for complete search history.

(56) References Cited

U.S. PATENT DOCUMENTS 6,832,232 B1 * 12/2004 Hus ....................... G06F 17/147
 708/401
7,289,047 B2 10/2007 Nagori
8,203,568 B2 6/2012 Clemie et al.
8,483,290 B2 7/2013 Nguyen et al.
8,542,745 B2 9/2013 Zhang et al.
(Continued)

FOREIGN PATENT DOCUMENTS

CN 101123723 A 2/2008

OTHER PUBLICATIONS

Han, et al., "Efficient Video Decoding on GPUs by Point Based Rendering", In Proceedings of the 21st ACM SIGGRAPH/ EUROGRAPHICS symposium on Graphics hardware, Sep. 3, 2006, 30 pages. (Year: 2006).*

(Continued)

*Primary Examiner* — Jeffery A Williams
(74) *Attorney, Agent, or Firm* — Shook Hardy & Bacon L.L.P.

(57) ABSTRACT

A GPU loads point sprites that represent coded blocks of transform coefficients of one or more frames encoded in a bitstream and loads a transform kernel as a transform kernel texture. The GPU constructs an output frame using an inverse transform on the coded blocks of transform coefficients by transforming the point sprites with the transform kernel texture and by optionally dequantizing the point sprites. A single render pass may be used in which the rasterization formula performs the inverse transform and optionally dequantization. To preserve bandwidth, a CPU may refrain from sending the GPU at least some zero valued transform coefficients for the point sprites. Also, to reduce processing, the transform coefficients can remain in a zig-zag arrangement. The transform kernel texture used in the decoding can correspond to a modified version of the basis matrices used to encode the frame, which compensates for the zig-zag arrangement.

20 Claims, 7 Drawing Sheets

(56) References Cited

U.S. PATENT DOCUMENTS

| | | | |
|---|---|---|---|
| 8,655,062 B2 | 2/2014 | Kuo et al. | |
| 8,850,027 B2 | 9/2014 | Srinivas et al. | |
| 9,167,020 B2 | 10/2015 | Abdo et al. | |
| 2007/0047655 A1* | 3/2007 | Vannerson | H04N 19/122 375/240.24 |
| 2008/0195698 A1* | 8/2008 | Stefanovic | H04N 7/17327 709/203 |
| 2013/0021350 A1 | 1/2013 | Schmit et al. | |
| 2014/0300758 A1 | 10/2014 | Tran | |
| 2015/0063451 A1* | 3/2015 | Zhu | H04W 4/18 375/240.09 |

OTHER PUBLICATIONS

Han, et al., "Efficient Video Decoding on GPUs by Point Based Rendering", In Proceedings of the 21st ACM SIGGRAPH/EUROGRAPHICS symposium on Graphics hardware, Sep. 3, 2006, 30 pages.

Yan, et al., "CUDA-Based Acceleration of the JPEG Decoder", In Proceedings of Ninth International Conference on Natural Computation, Jul. 23, 2013, pp. 1319-1323.

Sun, et al., "Real-time Screen Image Scaling and its GPU Acceleration", In Proceedings of 16th IEEE International Conference on Image Processing, Nov. 11, 2009, pp. 3285-3288.

Jones, Margaret, "Making the Case for HTML5 Clients", Published on: Dec. 2014 Available at: http://searchvirtualdesktop.techtarget.com/feature/Making-the-case-for-HTML5-clients.

Leung, et al., "Line-Space Representation and Compression for Image-Based Rendering", In Technical Report AMP 01-02, Mar. 2001, pp. 1-30.

Wang, et al., "An Optimized Parallel IDCT on Graphics Processing Units", In Proceedings of the 18th international conference on Parallel processing workshops, Aug. 27, 2012, 10 pages.

* cited by examiner

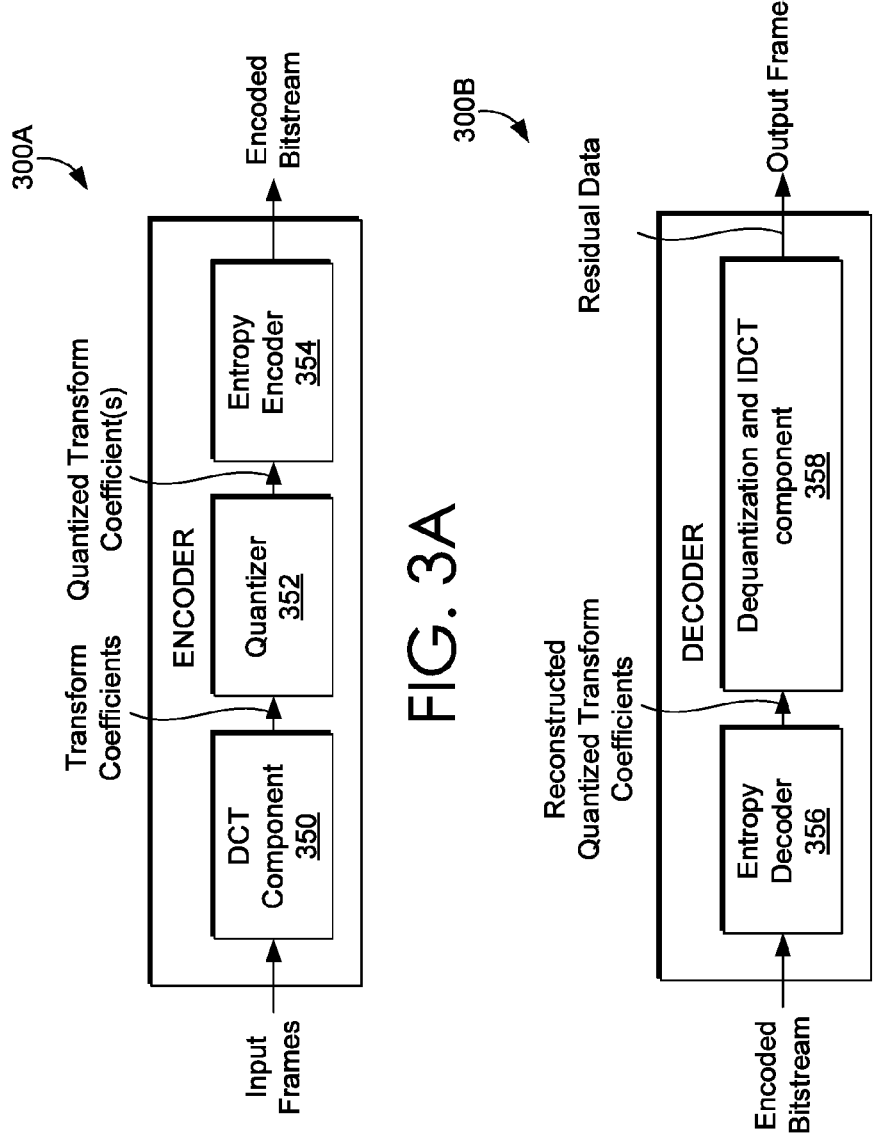

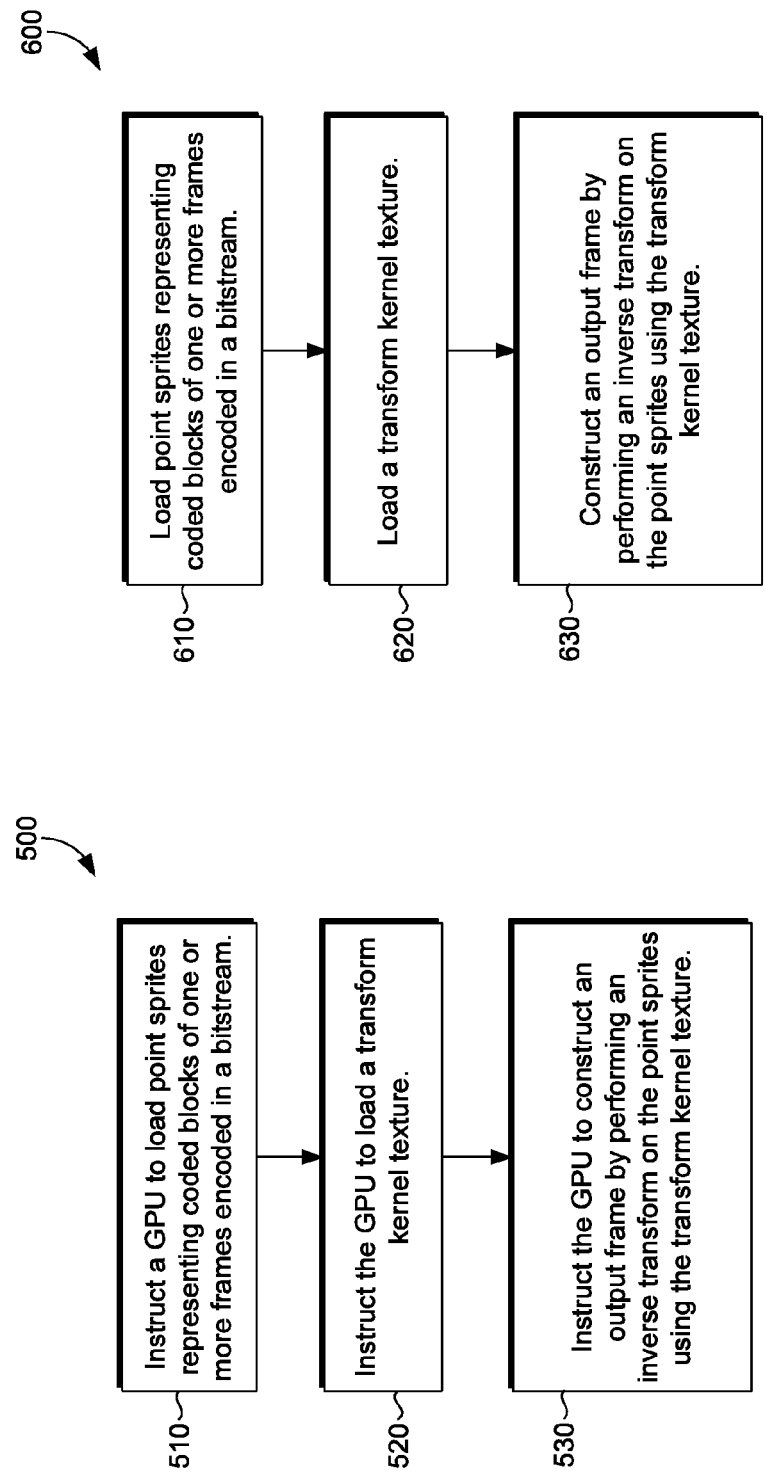

VIDEO DECODING USING POINT SPRITES

BACKGROUND

Media decoding is often performed by a central processing unit (CPU) of a computing device. While some computing devices, such as personal computers and laptops, commonly feature powerful CPUs, others, such as smart phones and tablets, are more likely to have lower performance CPUs. These lower performance CPUs may not be powerful enough to decode the media at an acceptable rate, especially while the CPUs are concurrently occupied with other processing jobs.

The load on the CPU can be reduced by offloading some of the decoding to a graphical processing unit (GPU). However, typical approaches to incorporating GPUs into the decoding process fail to take full advantage of high performance graphics technologies, which generally refers to specialized GPU technologies as opposed to merely mimicking CPU functionality on the GPU. Furthermore, these approaches require program code that implements the decoding process to be installed in a plug-in or application. It may be desirable to provide program code that incorporates the GPU into the decoding process, without these restrictions.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention can be performed on a client device running Remote Desktop (RD) client. The client device and RD client may be part of an operating environment having several components and subsystems. In operation, a user interacts with the RD client to connect to a remote desktop or application session (remote session) using the components and subsystems. The user may issue commands to the client device to interact with the remote session. The remote session transmits graphical output (e.g., GUI data) that is to be processed by and communicated to the RD client. The RD client may use a GPU to graphically process and display the GUI data.

Embodiments described herein disclose graphical processing involving both a CPU and the GPU, where some novel features incorporate high performance graphics technologies of the GPU. In particular, the present disclosure relates, in part, to decoding still images or video using point sprite technology of a GPU. In some embodiments, point sprites are objects used to represent frames encoded in a bitstream. Each point sprite can represent a block of transform coefficients that are used to mathematically represent a region of a frame. The GPU may optionally operate on point sprites to dequantize quantized transform coefficients stored therein, thereby offloading dequantization from the CPU. The GPU may also transform point sprites with a transform kernel texture (e.g., a texture storing the basis matrices used to apply an inverse discrete cosine transform) to perform an inverse transform, thereby offloading the application of the inverse transform to the transform coefficients from the CPU. In doing so, the decoding can leverage high performance point sprite technology incorporated in the GPU. The foregoing can be accomplished, for example, using browser-native program code executed by a web browser (e.g., Javascript) without requiring the installation of an additional plug-in or application.

In some respects, a CPU provides transform coefficients to a GPU for processing (e.g., as point sprites representing coded blocks). The processing can include dequantization and/or application of an inverse transform. In some cases, the CPU dequantizes the transform coefficients prior to providing them to the GPU. In other cases, the transform coefficients are still quantized and the GPU performs the dequantization. In providing transform coefficients, the CPU may choose to not transfer zero-valued transform coefficients to the GPU after entropy decoding, which reduces the bandwidth required to transfer the transform coefficients. For example, this can be done by the CPU transferring fixed length sets of coefficients, and omitting sets of coefficients containing only zero coefficients. As an alternative, this can be done by the CPU omitting trailing zero coefficients in a coded block.

In further respects, a GPU performs setup and preparation of point sprites for dequantization and/or application of an inverse transform using a vertex processing unit of the GPU (e.g., a vertex shader). This can include generating offsets for the point sprites that map position attributes of the point sprites to the corresponding basis matrices in the transform kernel texture, as well as determining any memory addresses needed by a fragment processing unit of the GPU to access transform coefficients represented by the point sprites (e.g., in the point sprite texture). The GPU also performs the dequantization and/or inverse transform using the fragment processing unit of the GPU (e.g., a fragment shader). This can include the GPU performing rasterization in which a fragment shader uses the offsets and memory addresses prepared by the vertex shader, and the rasterization formula performs the inverse transform on the transform coefficients. In some cases, dequantization is incorporated into the rasterization formula such that the dequantization is performed in conjunction with the application of the inverse transform using a single render pass to enhance decoding performance. In other cases, the fragment processing unit first performs dequantization of the transform coefficients in a first render pass, and subsequently applies the inverse transform in a second render pass. Where the CPU has already performed dequantization using the program code, the rasterization formula may only provide for the inverse transform.

In additional aspects of the present disclosure, an inverse transform is applied to transform coefficients that are in a zig-zag arrangement. The transform kernel (e.g., transform kernel texture) used to apply the inverse transform can correspond to a modified version of the basis matrices used to encode the bitstream, which compensates for the zig-zag arrangement. In doing so, the transform coefficients need not be unzig-zagged, thereby reducing processing power (e.g., of a CPU), and enabling reduction to the transfer size by omitting trailing zero coefficients in a coded block. These and other concepts are contemplated as being within the scope of the present disclosure.

BRIEF DESCRIPTION OF THE DRAWINGS

The present invention is described in detail below with reference to the attached drawing figures, wherein:

FIG. 3A is a flow diagram showing an example media encoding system in accordance with embodiments of the present disclosure;

FIG. 3B is a flow diagram showing an example media decoding system in accordance with embodiments of the present disclosure;

FIG. 5 is a flow diagram showing a method for video decoding using point sprites in accordance with embodiments of the present disclosure;

FIG. 6 is a flow diagram showing a method for video decoding using point sprites in accordance with embodiments of the present disclosure.

DETAILED DESCRIPTION

Figure 1:
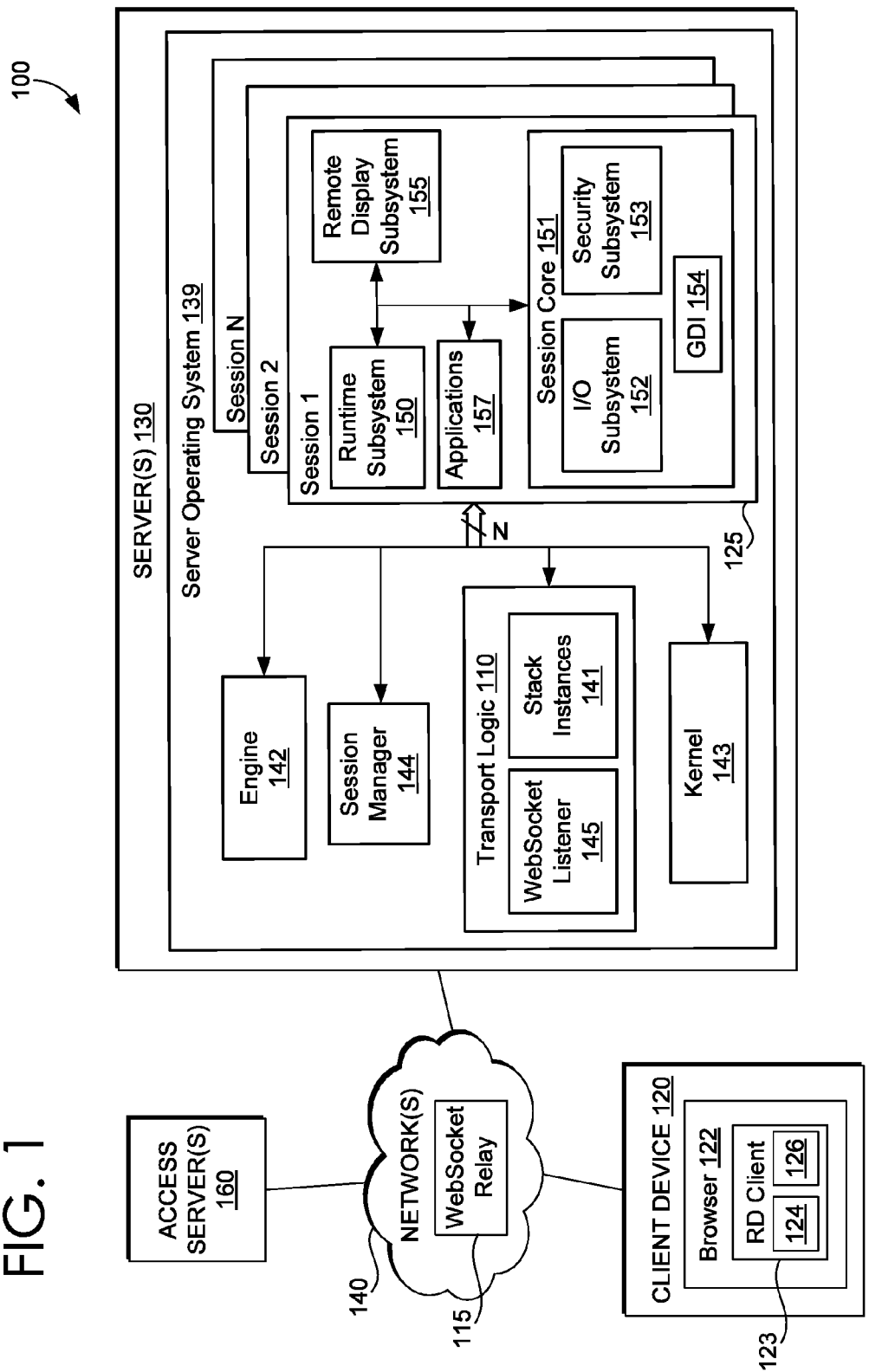
FIG. 1 shows a block diagram showing an example of an operational environment in accordance with embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present disclosure relates, in part, to decoding bitstreams using point sprites. Although various aspects of the present disclosure are described with respect to video decoding, it will be appreciated that those aspects also are applicable to the decoding of still images (e.g., Joint Photographic Experts Group (JPEG) images). In some implementations, point sprites are used to represent coded blocks of frames encoded in a bitstream (e.g., of a video or still image). Each point sprite can represent a block of transform coefficients that are used to mathematically represent a region of a frame. The GPU may operate on the point sprites to optimally dequantize transform coefficients stored therein, thereby offloading dequantization from the CPU. The GPU may also transform the point sprites with a transform kernel texture (e.g., a texture storing the basis matrices used to apply an inverse discrete cosine transform) to perform an inverse transform, thereby offloading the application of the inverse transform to the transform coefficients from the CPU. In doing so, the decoding can leverage high performance point sprite technology incorporated in the GPU. The foregoing can be accomplished, for example, using browser-native program code executed by a web browser (e.g., Javascript) without requiring the installation of an additional plug-in or application.

In some respects, a CPU provides transform coefficients to a GPU for processing (e.g., as point sprites representing coded blocks). The processing can include dequantization and/or application of an inverse transform. In some cases, the CPU dequantizes the transform coefficients prior to providing them to the GPU. In other cases, the transform coefficients are still quantized and the GPU performs the dequantization. In providing transform coefficients, the CPU may choose to not transfer zero-valued transform coefficients to the GPU after entropy decoding, which reduces the bandwidth required to transfer the transform coefficients. For example, this can be done by the CPU transferring fixed length sets of coefficients, and omitting sets of coefficients containing only zero coefficients. As an alternative, this can be done by the CPU omitting trailing zero coefficients in a coded block.

In further respects, a GPU performs setup and preparation of point sprites for dequantization and/or application of an inverse transform using a vertex processing unit of the GPU (e.g., a vertex shader). This can include generating offsets for the point sprites that map position attributes of the point sprites to the corresponding basis matrices in the transform kernel texture, as well as determining any memory addresses needed by a fragment processing unit of the GPU to access transform coefficients represented by the point sprites (e.g., in the point sprite texture). The GPU also performs the dequantization and/or inverse transform using the fragment processing unit of the GPU (e.g., a fragment shader). This can include the GPU performing rasterization in which a fragment shader uses the offsets and memory addresses prepared by the vertex shader, and the rasterization formula performs the inverse transform on the transform coefficients. In some cases, dequantization is incorporated into the rasterization formula such that the dequantization is performed in conjunction with the application of the inverse transform using a single render pass to enhance decoding performance. In other cases, the fragment processing unit first performs dequantization of the transform coefficients in a first render pass, and subsequently applies the inverse transform in a second render pass. Where the CPU has already performed dequantization using the program code, the rasterization formula may only provide for the inverse transform.

In additional aspects of the present disclosure, an inverse transform is applied to transform coefficients that are in a zig-zag arrangement. The transform kernel (e.g., transform kernel texture) used to apply an inverse transform can correspond to a modified version of the basis matrices used to encode the bitstream, which compensates for the zig-zag arrangement. In doing so, the transform coefficients need not be unzig-zagged, thereby reducing processing power (e.g., of a CPU), and enabling reduction to the transfer size by omitting trailing zero coefficients in a coded block.

It will be appreciated that this aspect of the present disclosure may be implemented without using point sprites or a transform kernel texture. In particular this aspect is generally applicable to any decoding process that performs an inverse transform on transform coefficients that have a zig-zag arrangement. For example, a CPU could apply the inverse transform. Furthermore, the transform kernel that is employed need not be in the form of a transform kernel texture. These and other concepts are contemplated as being within the scope of the present disclosure.

FIG. 1 depicts an example operational environment 100 for implementing aspects of the present disclosure. FIG. 1 represents an example of implementations that are incorporated into a remote desktop system. However, it will be appreciated that aspects of the present disclosure are applicable beyond remote desktop systems, and are more generally applicable to systems that employ media decoding technologies (e.g., video codecs). Examples of such systems include video streaming or playback systems.

Operational environment 100 includes client device 120 that is comprised of circuitry and code configured to effectuate Remote Desktop (RD) client 123 (e.g., a remote desktop protocol client). In the implementation shown, when effectuated, RD client 123 executes within a runtime environment of a web browser or other web based interface (e.g., browser 122). However, in other implementations, RD client 123 is part of a dedicated application or an application other than a web browser. In some implementations, the application(s) is hosted at least partially server-side. In some cases, the application(s) is integrated into the operating system (e.g., as a service).

Each of the components shown in FIG. 1 may be implemented via any type of computing device, such as one or more of computing device 200, described in connection to FIG. 2A, for example. These components may communicate with each other via network 140, which may be wired, wireless, or both. Network 140 can include multiple networks, or a network of networks, but is shown in simple form so as not to obscure aspects of the present disclosure. By way of example, network 140 can include one or more wide area networks (WANs), one or more local area networks (LANs), one or more public networks, such as the Internet, and/or one or more private networks. Where network 140 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 140 is not described in significant detail.

It should be understood that any number of client devices and servers may be employed within operational environment 100 within the scope of the present disclosure. Each may comprise a single device or multiple devices cooperating in a distributed environment. For instance, server 130 and access server 160 may be provided via multiple devices arranged in a distributed environment that collectively provide the functionality described herein. Additionally, other components not shown may also be included within the distributed environment. In some cases, functionality of server 130 and access server 160 are incorporated into a single device. Furthermore, server 130 and access server 160 can be at least partially implemented as a cloud computing service.

Client device 120 is on a client-side of operational environment 100, while server 130 and access server 160 are on a server-side of operational environment 100. Server 130 and access server 160 comprise server-side software designed to work in conjunction with client-side software on a client device so as to implement any combination of the features and functionalities discussed in the present disclosure. An example of such client-side software is browser 122 on client device 120. Other devices can be included in operational environment 100 and include a similar application, with similar functionality. This division of operational environment 100 is provided to illustrate one example of many suitable environments compatible with implementations of the present disclosure.

Client device 120 comprises a computing device capable of being operated by a user. For example, in some implementations, client device 120 is the type of computing device described in relation to FIG. 2A herein. By way of example and not limitation, a client device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device. Generally, in the implementation shown, client device 120 represents a device capable of receiving user input, transmitting the user input to a remote computing device(s) hosting a remote session, and displaying graphical data associated with the remote session received from the remote computing device(s).

Client device 120 includes one or more processors, and one or more computer-readable media. The computer-readable media may include computer-readable instructions executable by the one or more processors. The instructions may be embodied by one or more applications, such as browser 122 shown in FIG. 1. The application(s) are capable of facilitating the exchange of information between the client device and server 130 and access server 160 to carry out remote desktop sessions.

A user, in operational environment 100, interacts with RD client 123 via client device 120 to connect to a remote desktop or application session (remote session), such as session 125, hosted on server 130, over network 140. In some cases, a remote session corresponds to an operating system running on server 130.

A remote session in example embodiments includes an operational environment that is effectuated by a plurality of subsystems, e.g., software code, configured to interact with kernel 143 of server 130. Server 130 can include virtualization components permitting a plurality of computing devices, such as client device 120, to share underlying physical hardware, which can be via interaction with the subsystems. Examples of these subsystems include a process that instantiates a user interface (UI) such as a desktop window representing a graphical output created by the remote session, subsystems that track mouse movement within the window, subsystems that translate a mouse click on an icon into commands that effectuate an instance of a program, and the like. Such graphical output created by a remote session is referred to herein as "graphical user interface (GUI) data." GUI data can comprise a rendered display output from an operating system running on server 130 (e.g., a computer desktop).

In some implementations, client device 120 connects to remote sessions hosted on server 130 via access server 160 (e.g., a remote access server) by exchanging remote session data encoded according to an RD protocol (such as RDP using RDP-encoded data). For example, client device 120 may establish a hypertext transport protocol (HTTP) connection with access server 160 using browser 122. Through the HTTP connection, access server 160 provides client device 120 with program code, such as browser-native program code, that browser 122 executes to instantiate RD client 123 (e.g., the program code comprises RD client 123).

In some implementations, in response to a connection request, access server 160 sends a connection response to client device 120 comprising a file (e.g., an HTML file for a web page) associated with access server 160. Client device 120 stores the connection response in a computer-readable storage device accessible by browser 122. Access server 160 can provide client device 120 with browser-native program code (or scriptable logic) by embedding the browser-native program code (or scriptable logic) within the file. Alternatively, access server 160 may provide client device 120 with browser-native program code (or scriptable logic) by including instructions (e.g., embedded links) in the file that directs browser 122 of client device 120 to a network storage location (not shown) where the browser-native program code (or scriptable logic) may be downloaded.

The program code can be scriptable logic (e.g., Javascript) that browser 122 executes within its native runtime environment to instantiate RD client 123. RD client 123 can be, for example, a native RD client executing within browser 122. In the implementation shown, RD client 123 includes socket client 124 that establishes a socket connection with a socket host. The socket host can be implemented using a network relay (e.g. WebSocket relay 115). In some cases, the socket host is implemented as a socket listener in transport logic 110, such as WebSocket listener 145.

While the remote session data exchanged between server 130 and client device 120 may be encoded according to RDP, those skilled in the art will recognize that the remote session data (e.g., a rendered display output from an operating system running on server 130) may be encoded according to any known remote presentation session protocol without departing from the spirit of the present disclosure.

Figure 2A:
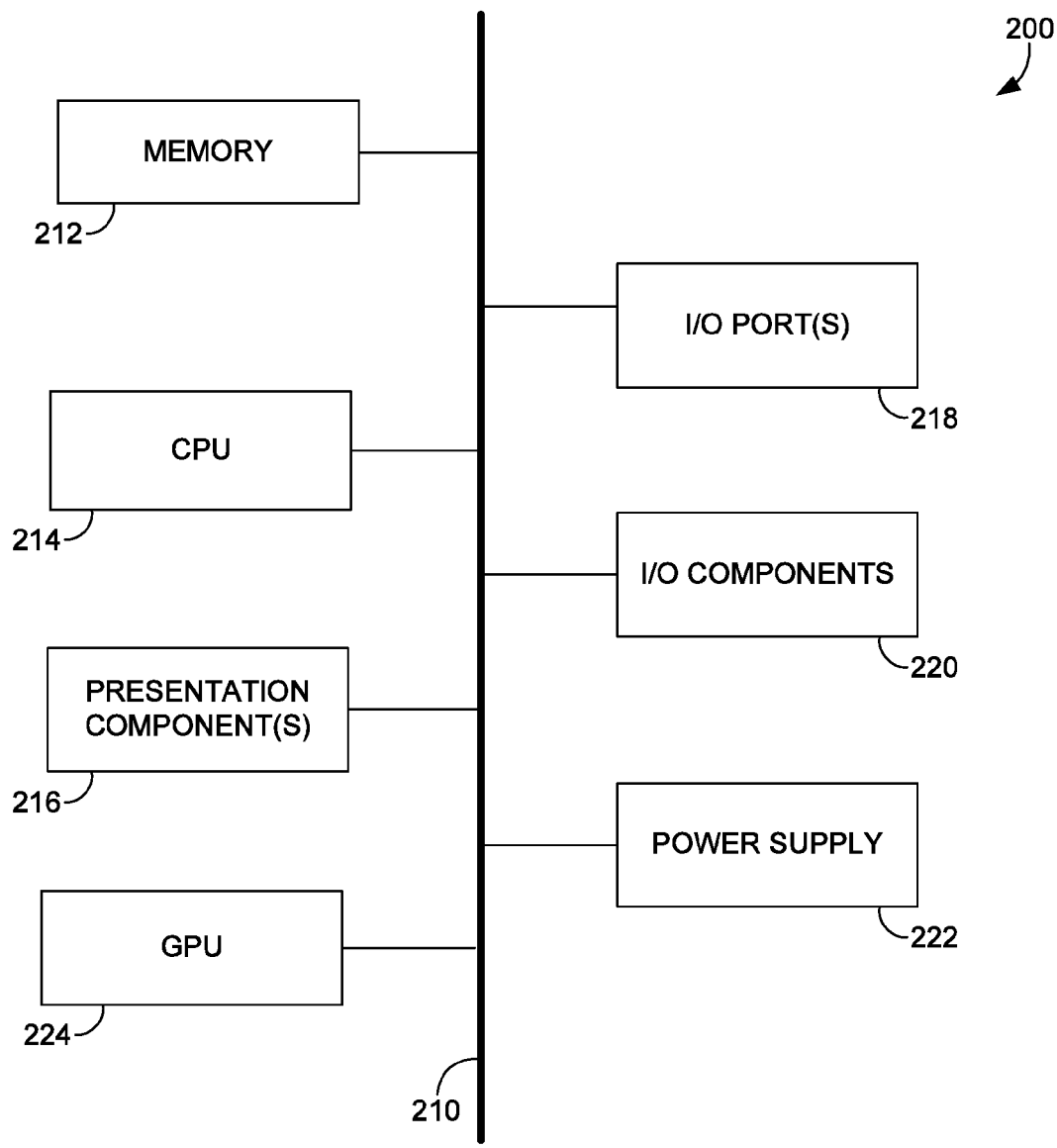
FIG. 2A is a block diagram of an exemplary computing environment suitable for use in implementations of the present disclosure.

Once connected to a session (e.g., session 125), the user may interact with the remote session by providing commands and other information (user input) to client device 120 through input devices of client device 120, examples of which are described in FIG. 2A. Client device 120 encodes the user input into RDP-encoded user input using RDP and transmits the RDP-encoded user input to server 130 that hosts the remote session using a network interface card (NIC). Client device 120 may encode the user input with an RDP codec. Server 130 decodes the RDP-encoded user input upon receipt and injects the user input into the remote session.

The remote session generates GUI data, which server 130 encodes into RDP-encoded GUI data for transmission to client device 120. Upon receipt, RD client 123 executing within browser 122, decodes the RDP-encoded GUI data using the browser-native program code (or scriptable logic that browser 122 executes within its native runtime environment). RD client 123 forwards the decoded RDP-encoded GUI data to browser 122 which uses its native decoding capabilities to display the GUI data. For example, RD client 123 may forward the decoded RDP-encoded GUI data may be forwarded to the native decoding capabilities of browser 122 through a "video" tag. In some cases, RD client 123 translates the decoded RDP-encoded GUI data into a series of browser-native graphics operations and forwards the series of browser-native graphics operations to browser 122. For example, RD client 123 may forward to browser 122 one or more "canvas" tags.

As RD client 123 is executed within the application framework of browser 122, in some implementations, RD client 123 is allowed access to only those system resources (e.g., CPU time, memory, etc.) that are accessible to browser 122. Furthermore, RD client 123 may be instantiated in the browser through browser-native program code (e.g. Javascript) in an HTML file. Accordingly, aspects of the present invention may be implemented without installing a plug-in to web browser 122 or a specific application to client device 120. Thus, RD client 123 may be easy to deploy on a variety of platforms, including mobile or desktop operating systems.

Server 130 is comprised of circuitry and code configured to effectuate a remote presentation session server. Server 130 can further include circuitry and code configured to support remote desktop connections. In the example depicted by FIG. 1, server 130 generates one or more remote sessions for connecting clients (e.g., client device 120) such as sessions 1 through N (where N is an integer greater than 2). A remote session can be generated by server 130 on a user-by-user basis when, for example, server 130 receives a remote presentation session connection request over a network connection (e.g. network 140) from a client device, such as client device 120.

Generally, a remote presentation session connection request can be handled by transport logic 110 that can, for example, be effectuated by circuitry of server 130. Transport logic 110 can in some embodiments include a network adaptor; firmware, and software configured to receive connection messages and forward them to engine 142. As illustrated by FIG. 1, transport logic 110 may include protocol stack instances 141 for each session. Generally, each of protocol stack instances 141 can be configured to route user interface output to a client device and route user input received from the client device to the session core (e.g., session core 151) associated with its session (e.g., session 125).

Engine 142, in some embodiments, is configured to process requests for sessions; determine the functionality for each session; generate sessions by allocating a set of physical resources each session; and instantiate a protocol stack instance for each session. In some embodiments engine 142 is effectuated by specialized circuitry components and code that implement some of the above mentioned operational procedures. For example, the circuitry can include memory and one or more processors configured to execute code that effectuates engine 142.

Session manager 144, illustrated in FIG. 1, is configured to receive a message from engine 142 and in response to the message, session manager 144 can: add a session identifier to a table; assign memory to the session identifier; and generate system environment variables and instances of subsystem processes in memory assigned to the session identifier.

Session manager 144 may additionally instantiate an instance of a logon process associated with the session identifier of the session that can be configured to handle logon and logoff for the session. In these example embodiments, drawing commands indicative of the graphical user interface associated with the logon process can be transmitted to client device 120 where a user of client device 120 can input an account identifier, e.g., a username/password combination, a smart card identifier, and/or biometric information into a logon screen. The information can be transmitted to server 130 from browser 122 and routed to engine 142 and security subsystem 153 of session core 151. Engine 142 can be configured to determine whether the user account is associated with a license; and security subsystem 153 can be configured to generate a security token for the session.

Session manager 144 can instantiate environment subsystems such as a runtime subsystem 150 that can include a kernel mode part such as session core 151. For example, the environment subsystems in an embodiment are configured to expose some subset of services to application programs (e.g., applications 157) and provide an access point to kernel 143 of operating system 139. In example embodiments, runtime subsystem 150 controls the execution of processes and threads and session core 151 can send requests to the executive of kernel 143 to allocate memory for the threads and schedule time for them to be executed. In embodiments, session core 151 includes graphics display interface (GDI) 154, security subsystem 153, and input subsystem 152.

Input subsystem 152 is configured to receive user input from client device 120 via the protocol stack instance associated with session 125 and transmit the input to session core 151 for the appropriate session. The user input can in some embodiments include signals indicative of absolute and/or relative mouse movement commands, mouse coordinates, mouse clicks, keyboard signals, joystick movement signals, etc. User input, for example, a double-click on an icon, can be received by session core 151 and input subsystem 152 can be configured to determine that an icon is located at the coordinates associated with the double-click. Input subsystem 152 can then send a notification to runtime subsystem 150 that can execute a process for the application (e.g., one of applications 157) associated with the icon.

In addition to receiving input from client device 120, draw commands can be received from applications and/or a desktop and be processed by GDI 154. GDI 154 in general can include a process that can generate graphical object draw commands GDI 154 in this example embodiment can be configured to pass its output to remote display subsystem 155 where the commands are formatted for the display driver that is attached to the session. In certain example embodiments one or more physical displays can be attached to server 130, e.g., in a remote desktop situation. In these example embodiments remote display subsystem 155 can be configured to mirror the draw commands that are rendered by the display driver(s) of the remote computer system and transmit the mirrored information to client device 120 via a stack instance associated with the session.

In embodiments where server 130 is a remote presentation session server, remote display subsystem 155 can be configured to include virtual display driver(s) that may not be associated with displays physically attached to server 130, such as where server 130 is running headless. Remote display subsystem 155 in these embodiments can be configured to receive draw commands for one or more virtual displays and transmit them to client device 120 via a stack instance associated with session 125. In some cases, remote display subsystem 155 is configured to determine the display resolution for each display driver, e.g., determine the display resolution of the virtual display driver(s) associated with virtual displays or the display resolution of the display drivers associated with physical displays; and route the packets to client device 120 via the associated protocol stack instance.

In a remote session with client device 120, server 130 may transmit the graphical output of what is being remoted (e.g. GUI data) to Client device 120 via the remote presentation session as encoded GUI data (e.g., RDP-encoded GUI data). The encoded GUI data can comprise video encoded by remote display subsystem 155. For example, remote display subsystem 155 can encode frames of GUI data as video, which may comprise a computer desktop at different points in time. The encoding of the frames can be performed by server 130 using media encoding system 300A of FIG. 3A, as an example.

In some implementations, server 130 transmits the encoded GUI data to Client device 120 by sending the encoded GUI data comprised of a plurality of remote presentation protocol packets to the socket host. The socket host transmits the encoded GUI data to RD client 123 over the socket transport channel. The encoded GUI data may be prepared for transmission over the socket transport channel by encapsulating each of the remote presentation protocol packets—otherwise unaltered—into socket frames. As appreciated by one skilled in the art, no middle-ware APIs are needed since RD client 123 executing within a runtime environment of browser 122 receives the encoded GUI data as transmitted by server 130.

Also in some implementations, RD client 123 receives the encapsulated encoded GUI data and de-encapsulates the otherwise unaltered encoded GUI data using the browser-native program code (or scriptable logic) that executes within the browser's native runtime environment). RD client 123 decodes the encoded GUI data and forwards the decoded data to browser 122. Browser 122 may be configured to process data in HTML (e.g., HTML5) format, including natively decoding one or more video formats referenced by an HTML <video> tag using RD client 123.

Client device 120 decodes the video and displays it in browser 122. In various implementations, client device 120 implements media decoding system 300B for this purpose. In certain embodiments, RD client 123 decodes the encoded GUI data to produce GUI data in a format that browser 122 can display directly. The decoding can produce frames of video and can be performed in accordance with implementations of the present disclosure that will later be described in additional detail. In various implementations, client device 120 includes a GPU (Graphics Processing Unit), and RD client 123 offloads some of the decode process of the encoded GUI data to the GPU. This can be accomplished, for example, using WebGL APIs that are accessed by the browser-native program code (e.g., Javascript).

Thus, in some respects, the present application provides for decoding that can be drastically accelerated by offloading some of the decode process from a CPU of a client device to a GPU of the client device. Furthermore, as described above, this can be accomplished by program code executing on the client device (e.g., of an RD client, a video streaming and/or playback client, or other video decoding client), such as Javascript, that is compatible with a wide variety of platforms without requiring installation of specific plug-ins or applications. FIG. 2A illustrates an example of a computing device that can correspond to a device (e.g., client device 120) that implements various aspects of the present disclosure.

FIG. 2A is a block diagram of computing device 200 suitable for use in implementations of the present disclosure. Computing device 200 can correspond, for example, to client device 120 of FIG. 1. In some cases, server 130 and access server 160 can also each correspond to computing device 200. Computing device 200 includes bus 210 that directly or indirectly couples the following devices: memory 212, CPU 214, one or more presentation components 216, input/output (I/O) ports 218, input/output components 220, power supply 222, and GPU 224. Bus 210 represents what may be one or more busses (such as an address bus, data bus, or combination thereof). Although the various blocks of FIG. 2A are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 2A is merely illustrative of an exemplary computing device that can be used in connection with one or more embodiments of the present invention. Distinction is not made between such categories as "workstation," "server," "laptop," "handheld device," etc., as all are contemplated within the scope of FIG. 2A and reference to "computing device."

Computing device 200 typically includes a variety of computer-readable media. Computer-readable media can be any available media that can be accessed by computing device 200 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 200. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 212 includes computer-storage media in the form of volatile and/or nonvolatile memory. The memory may be removable, non-removable, or a combination thereof. Exemplary hardware devices include solid-state memory, hard drives, optical-disc drives, etc. Memory 212 includes system memory, such as read only memory (ROM) and/or random access memory (RAM), coupled to a system bus. Computing device 200 includes one or more processors that read data from various entities such as memory 212 or I/O components 220. Presentation component(s) 216 present data indications to a user or other device. Exemplary presentation components include a display device, speaker, printing component, vibrating component, etc.

I/O ports 218 allow computing device 200 to be logically coupled to other devices including I/O components 220, some of which may be built in. Illustrative components include a microphone, joystick, game pad, satellite dish, scanner, printer, wireless device, etc. The I/O components 220 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 200.

Computing device 200 may be equipped with depth cameras, such as stereoscopic camera systems, infrared camera systems, RGB camera systems, and combinations of these, for gesture detection and recognition. Additionally, the computing device 200 may be equipped with accelerometers or gyroscopes that enable detection of motion. The output of the accelerometers or gyroscopes may be provided to the display of the computing device 200 to render immersive augmented reality or virtual reality.

Figure 2B:
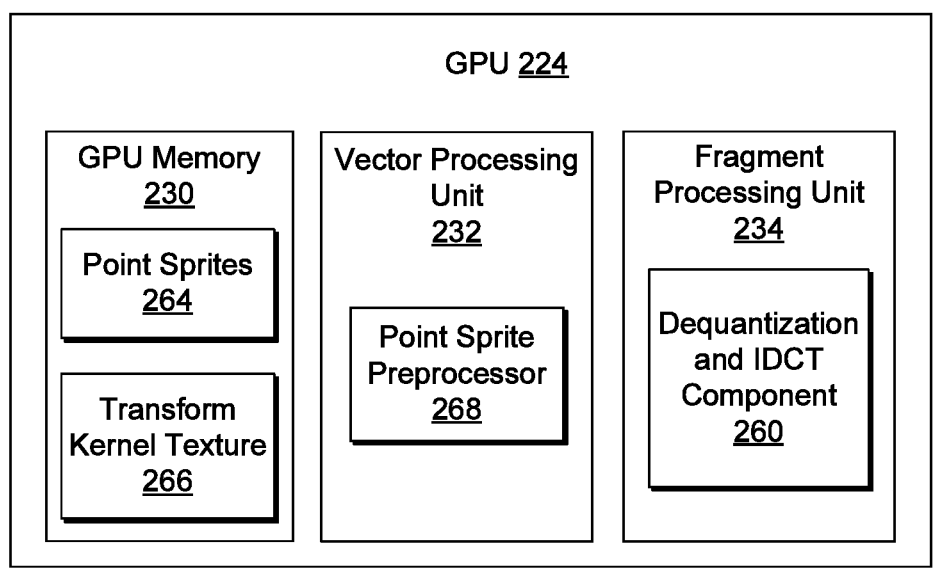
FIG. 2B is a block diagram of an exemplary graphics processing unit (GPU) suitable for use in implementations of the present disclosure.

GPU 224 is a specialized microprocessor optimized to manipulate computer graphics. FIG. 2B shows an example of a more detailed view of GPU 224, in accordance with implementations of the present disclosure. GPU 224 may have its own graphics memory, indicated as GPU memory 230 in FIG. 2B, and/or may have access to a portion of system memory, such as in memory 212, of FIG. 2A. GPU memory 230 can comprise, for example, texture and video memory. Furthermore, GPU 224 may comprise one or more processing units (GPU processors), each having one or more cores. Those processing units can be used to realize vector processing unit 232 and fragment processing unit 234.

Vector processing unit 232 and fragment processing unit 234 can be WebGL and/or OpenGL compatible processing units and can be used to implement a graphics processing pipeline with GPU 224. Vector processing unit 232 may correspond to multiple vertex processors working in parallel, or a single processor. Similarly, fragment processing unit 234 may correspond to multiple fragment processors working in parallel, or a single processor.

Programs of GPU 224 that run at the vertex level, referred to as vertex shaders, are run on vector processing unit 232. The vertex level involves operations that occur at each vertex. A vertex can refer to a point in three-dimensional (3D) space; additional data such as color, normal, and texture coordinates can be attached to each vertex. Vertex shaders typically affect only a series of vertices and thus can only alter vertex properties, such as position, color, and texture coordinates. Vector processing unit 232 can receive as input a set of 3D vertices and processes them to obtain 2D screen positions.

Programs of GPU 224 that run at the pixel level, referred to as fragment shaders or pixel shaders, are run on fragment processing unit 234. The pixel level involves operations that occur at each fragment. A pixel fragment can be obtained after a rasterization stage of the graphic pipeline and contains coordinates corresponding to a pixel, as well as chromatic and depth values. Fragment shaders typically use a rasterization formula to calculate the color value of individual pixels when the polygons produced by vertex and geometry shaders are rasterized. They are often used for scene lighting and related effects such as bump mapping and color toning. Fragment processing unit 234 is configured to convert pixel fragments into final pixels for the frame buffers.

Vector processing unit 232 includes point sprite preprocessor 268 and fragment processing unit 234 includes dequantization and IDCT component 260, which computing device 200 can use to decode media. In particular, these components may be used to realize media decoding system 300B of FIG. 3B, as later described in additional detail.

Turning to FIG. 3A, media encoding system 300A is shown in accordance with embodiments of the present disclosure. Media encoding system 300A comprises DCT component 350, quantizer 352, and entropy encoder 354. In encoding input frames, DCT component 350 applies a transform to decorrelate image data of the input frames resulting in transform coefficients, quantizer 352 quantizes the resulting transform coefficients, and entropy encoder 354 entropy codes the quantized values from quantizer 352 resulting in an encoded bitstream.

In the implementation shown, DCT component 350 applies a transform, which is a discrete cosine transform (DCT) in the present example, to input frames to generate transform coefficients. The transform converts input data into the frequency domain. Quantizer 352 reduces the number of bits needed to store the transform coefficients from DCT component 350 by reducing the precision of those values. In various implementations, quantizer 352 divides the transform coefficients by values greater than 1, so they can be coded using fewer bits. Entropy encoder 354 further compresses the quantized values losslessly using a known model to determine the probabilities for each quantized value and produce an appropriate code based on these probabilities so that the resultant output code stream will be smaller than the input stream.

Media encoding system 300A is a block-based encoding system in which each frame is divided into coded blocks called macroblocks. DCT component 350, quantizer 352, and entropy encoder 354 operate on these macroblocks. As an example, a 1920×1080 video could be divided into 8160 Macroblocks. Macroblocks can include separated blocks for luma and chroma signals. Where media encoding system 300A is based on a Moving Picture Experts Group (MPEG) video codec, such as H.264, a macroblock can include one 16×16 luma block and two 8×8 chroma blocks, as an example. The blocks can be broken down for processing. The examples shown herein, for example, utilize 4×4 sub-blocks, resulting in 4×4 transform coefficient blocks. However, it is noted that the blocks can take other dimensions and need not be square blocks (e.g., they may be rectangular and also can vary in size from block to block).

In some implementations, media encoding system 300A reorders the transform coefficients of the transform coefficient blocks in a zig-zag fashion. In particular, entropy encoder 354 may scan the quantized transform coefficient blocks in a zig-zag fashion. An example of a 4×4 quantized transform coefficient block Q follows:

$$Q = \begin{bmatrix} 180 & 40 & -4 & 0 \\ -16 & 12 & 20 & 0 \\ -28 & -20 & 0 & 0 \\ 8 & 8 & 0 & 0 \end{bmatrix}$$

An example of the above 4×4 quantized transform coefficient block scanned in a zig-zag fashion follows: {180, 40, −4, −16, −28, 12, −4, 0, 20, −20, 8, 8, 0, 0, 0, 0}. Re-ordering quantized transform coefficient blocks in a zig-zag fashion capitalizes on the energy compaction properties of the discrete cosine transform applied by DCT component 350, as indicated by the non-zero values being concentrated in the top left corner of the quantized transform coefficient block above.

Turning to FIG. 3B, media decoding system 300B is shown in accordance with embodiments of the present disclosure. Media decoding system 300B comprises entropy decoder 356 and dequantization and IDCT component 358. In decoding encoded bitstreams, entropy decoder 356 is configured to entropy decode the encoded bitstreams resulting in reconstructed quantized transform coefficients, dequantization and IDCT component 358 both dequantizes and applies an inverse DCT to the reconstructed transform coefficients to form residual data for constructed output frames. It will be appreciated that in various implementations, the output frame data (e.g., residual data) of IDCT component 360 can be used to construct output frames using intra-prediction or inter-prediction (e.g., for motion compensation).

In decoding bitstreams on a computing device, dequantization and an inverse discrete cosine transform are typically applied by the CPU of the computing device, such as CPU 214 of computing device 200 in discrete steps. Applying an inverse discrete cosine transform and performing dequantization is generally computationally intensive, which can overload the CPU, resulting in low frame rates of decoded video or media. This can be compounded in multimedia applications (e.g., real-time multimedia applications), such as remote desktop or other video streaming applications, where the CPU is more often heavily loaded by tasks other than decoding. In accordance with some implementations of the present disclosure, an inverse transform and/or dequantization are performed by the GPU, thereby reducing the processing requirements of the CPU and facilitating high frame rate decoding.

Returning to FIG. 2B, GPU 224 includes point sprite preprocessor 268 and dequantization and IDCT component 260. Point sprite preprocessor 268 and dequantization and IDCT component 260 can be implemented in shaders of the GPU. Dequantization and IDCT component 260 correspond to dequantization and IDCT component 358 of media decoding system 300B. By implementing these components on GPU 224, GPU 224 reduces the processing requirements of CPU 214 to implement media decoding system 300B. It is noted that in some implementations, dequantization and IDCT component 260 is implemented on both GPU 224 and CPU 214. In particular, CPU 214 may perform at least some of the dequantization and GPU 224 may apply the inverse transform.

In the implementation shown, point sprite preprocessor 268 is effectuated by vector processing unit 232. In particular, point sprite preprocessor 268 can be implemented on a vertex shader of vector processing unit 232. Also in the implementation shown, dequantization and IDCT component 260 is effectuated by fragment processing unit 234. In particular, dequantization and IDCT component 260 can be implemented on a fragment shader of fragment processing unit 234. By way of example, CPU 214 can load the shader code corresponding to the aforementioned components into GPU 224. As an example, the shader code can be included with the browser-native program code that is delivered to the client and the browser-native program code can instruct the GPU to load the shader code (e.g., in remote desktop applications).

In various implementations, CPU 214 receives an encoded bitstream and implements entropy decoder 356 by entropy decoding the bitstream. CPU 214 instructs GPU 224 to load the resultant reconstructed quantized transform coefficients for dequantization and for application of an inverse transform by dequantization and IDCT component 260. In some implementations, quantized transform coefficient blocks are represented using point sprites (e.g., that represent or correspond to respective and non-overlapping portions of the frame) that CPU 214 instructs GPU 224 to load (e.g., point sprites 264) into GPU 224. In response to one or more instructions from CPU 214, GPU 224 may load the point sprites into GPU memory 230, as illustrated with respect to point sprites 264. Each point sprite of point sprites 264 can be used to represent a respective quantized transform coefficient block (e.g., of a single input frame). It is noted that in other implementations, CPU 214 first dequantizes those coefficient blocks and provides the dequantized transform coefficient blocks to GPU 224 for the point sprites.

In representing a transform coefficient block using a point sprite, the point primitive attributes of the point sprite can define the location and coordinates of the transform coefficient block. For example, gl_PointCoord can contain the coordinates, and gl_Position can contain the location of the transform coefficient block for an output frame. In some implementations, the point size of the point sprite is also specified in the point primitive attributes as a dimension of the transform coefficient block. The point size can be contained in gl_PointSize.

CPU 214 also instructs GPU 224 to load a transform kernel for IDCT component 260 to apply to the transform coefficient blocks. In particular, CPU 214 instructs GPU 224 to load the transform kernel as a transform kernel texture, such as transform kernel texture 266 in FIG. 2B. In response, GPU 224 can load the transform kernel texture into texture memory of GPU memory 230. Transform kernel texture 266 corresponds to IDCT basis matrix tables used by dequantization and IDCT component 260 in applying the inverse transform.

In response to CPU 214 instructing GPU 224 to load the transform coefficients for dequantization and/or for application of an inverse transform by dequantization and IDCT component 260 (e.g., to construct an output frame), vector processing unit 232 of GPU 224 executes point sprite preprocessor 268 to prepare the point sprites for the processing by dequantization and IDCT component 260. This can include point sprite preprocessor 268 generating an offset for each point sprite that fragment processing unit 234 uses to map a position attribute (e.g., gl_Position) of the point sprite to its corresponding basis matrix in the transform kernel texture that fragment processing unit 234 will apply to the point sprite to perform the inverse transform. This can also include determining any memory addresses needed by fragment processing unit 234 to access the transform coefficients represented by the point sprite (e.g., a starting location of the point sprite texture, such as a top left corner).

Fragment processing unit 234 executes dequantization and IDCT component 260 using the pre-calculated data from point sprite preprocessor 268. For example, point sprite preprocessor 268 can prepare the pre-calculated data for each point sprite needed to construct an output frame. Fragment processing unit 234 can perform row-column IDCT to generate luma and chroma components for residual data corresponding to a constructed output frame. This can be accomplished, for example, by fragment processing unit 234 in rasterization that applies the point sprites to the transform kernel texture based on each point sprites respective offset, for each point sprite needed to construct an output frame. For example, fragment processing unit 234 can apply a rasterization formula at locations of the loaded transform kernel texture that are determined by the offsets generated by vector processing unit 232. In particular, the rasterization formula can be applied to all of the transform block coefficients in parallel.

In some implementations, dequantization and IDCT component 260 performs dequantization of the transform coefficients and applies the inverse transform to the transform coefficients in a single render pass. In particular, the rasterization formula can perform each operation on each transform coefficient and with a corresponding basis matrix coefficient for a single fragment. In other implementations, dequantization and IDCT component 260 performs dequantization of the transform coefficients and applies the inverse transform to the transform coefficients using multiple render passes. For example, dequantization and IDCT component 260 may apply the dequantization to the transform coefficients for each transform coefficient for an output frame, and subsequently perform the inverse transform for each of the dequantized coefficients on the resultant values. Utilizing a single render pass over multiple render passes may reduce decoding time.

Figure 4:
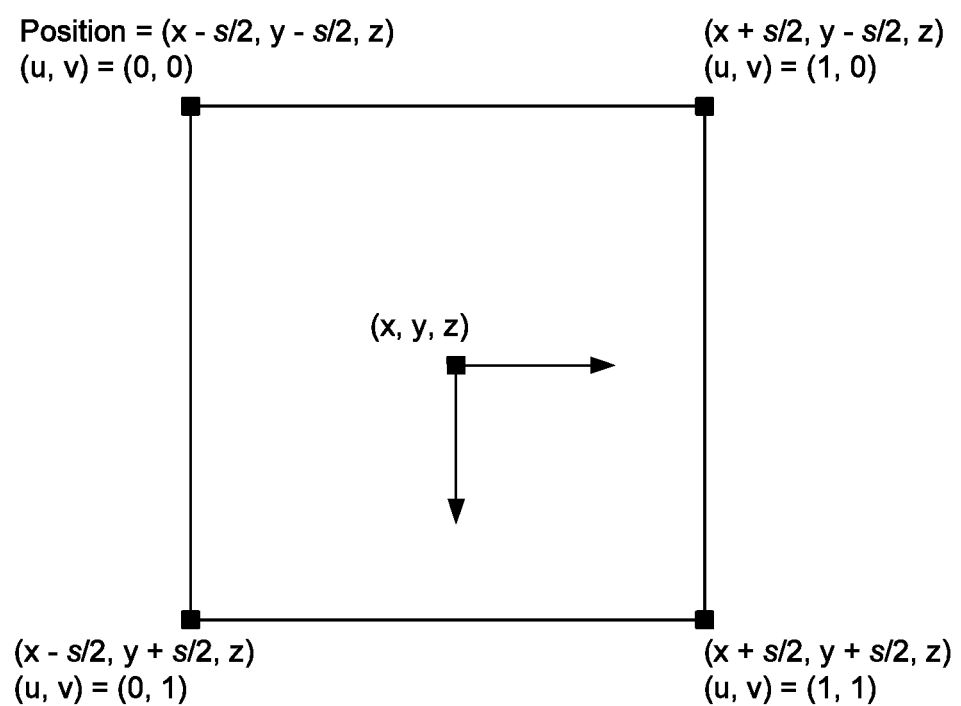
FIG. 4 illustrates mapping for a point sprites to a transform kernel texture in accordance with embodiments of the present disclosure.

FIG. 4 shows an example of how a point sprite can be mapped to a transform kernel texture used to apply an inverse discrete cosine transform. Each point sprite can represent a quad where the upper left corner has texture coordinates (0, 0) and the lower right corner has texture coordinates (1, 1). The point rasterization can produce a fragment for each framebuffer pixel as determined by point size s and vector processing unit 232 rasterizes with the center of the quad centered at point (x, y), as shown in FIG. 4. All fragments can be assigned the same data associated with the point with varying texture coordinates based on point size s. In some cases, point size s varies amongst the point sprites that correspond to a single encoded frame. Additionally, any suitable combination of square and/or rectangular point sprites may be employed. Vector processing unit 232 inputs the points and processes them. The point (x,y) is used to generate the offset that will be used to access the transform kernel texture, or IDCT basis texture. Vector processing unit 232 also sets up the coefficients and offset to be used by fragment processing unit 234. Fragment processing unit 234 can perform the IDCT operation to realize the luma and chroma corresponding to the pixels in the block.

The forgoing can be accomplished using instructions provided to GPU 224 from CPU 214 generated using program code executing on CPU 214, and further using instructions implemented using shader code executing on GPU 224. In some implementations, the program code is browser-native program code, such as scriptable logic (e.g., Javascript). In some implementations, the program code corresponds to RD client 123 of FIG. 1. However, the program code could be part of a video streaming and/or playing application, or other video decoding application, as described above. The program code can instruct GPU 224 in the manner described above using a GPU application program interface (API), such as a WebGL interface. More particularly, CPU 214 may provide one or more API instructions to GPU 224 to instruct GPU 224 in the manner described above. Thus, in some implementations, video decoding is accelerated on a computing device without requiring installation of specific plug-ins or applications. Rather, the program code can run natively in an application (e.g., browser) that hosts the program code on the computing device.

Dequantization and IDCT component 260 can apply the inverse transform in a packed or unpacked manner In a packed manner, the separable IDCT property performs 1D IDCT on rows followed by IDCT on columns. The transform kernel texture (e.g., transform kernel texture 266) contains the 1D IDCT matrices. For example, if a transform coefficient block is 4×4, such as in the examples shown, the transform kernel texture can contain sixteen 4×1 transform matrices. In an unpacked manner, the transform kernel texture contains the basis matrices corresponding to all elements in a transform coefficient block. For example, for a 4×4 reconstructed transform coefficient block, there can be sixteen basis matrices.

In some implementations, the present disclosure further provides for applying IDCT to transform coefficient blocks that are arranged in a zig-zag fashion. Typically, transform coefficient blocks are unzig-zagged by the CPU and IDCT is applied to the unzig-zagged transform coefficient blocks. By maintaining the zig-zag arrangement of the transform coefficient blocks and applying the inverse discrete cosine transform to those reconstructed transform coefficient blocks, processing power is preserved. Also, the trailing zero coefficients at the end of the coded block are maintained (allowing CPU 214 to easily identify the trailing zeros and refrain from sending those trailing zeros). Thus, CPU 214 need not unzig-zag the transform coefficient blocks.

In some implementations, the inverse discrete cosine transform is applied to the zig-zagged transform coefficient blocks using modified basis matrices, with a corresponding transform kernel texture, when employed, that compensates for the zig-zag arrangement of coefficients. As an example, the 2D 4×4 IDCT basis function to do the IDCT with the transformed coefficients D(u,v) is given as:

$$X_C(x, y) \triangleq \sum_{u=0}^{3} \sum_{v=0}^{3} C_u C_v D(u, v) \left( \cos\frac{(2*x+1)\pi u}{8} \cos\frac{(2*y+1)\pi v}{8} \right)$$

$$C_{u,} = \frac{1}{2} \text{ for } u = 0, \text{ otherwise } \sqrt{\frac{1}{2}}$$

$$C_{v,} = \frac{1}{2} \text{ for } v = 0, \text{ otherwise } \sqrt{\frac{1}{2}}$$

The modified 2D 4×4 IDCT basis function to do the inverse transform with the unzig-zagged coefficients D(u, v) is given by:

$$(u', v') = \text{ZigZag}(u, v)$$

$$X_C(x, y) \triangleq$$

$$\sum_{u=0}^{3} \sum_{v=0}^{3} C_u C_v D(u, v) \left( \cos\frac{(2*x+1)\pi u'}{8} \cos\frac{(2*y+1)\pi v'}{8} \right)$$

$$C_{u,} = \frac{1}{2} \text{ for } u = 0, \text{ otherwise } \sqrt{\frac{1}{2}}$$

$$C_{v,} = \frac{1}{2} \text{ for } v = 0, \text{ otherwise } \sqrt{\frac{1}{2}}$$

$$\text{Where ZigZag}(u, v) = \begin{cases} \{(0,0), (0,1), (1,1), (1,2)\}, \\ \{(0,2), (1,0), (1,3), (3,0)\}, \\ \{(0,3), (2,0), (2,3), (3,1)\}, \\ \{(2,1), (2,2), (3,2), (3,3)\} \end{cases}$$

By implementing the modified IDCT basis function in dequantization and IDCT component 260, CPU 214 can provide the zig-zagged reconstructed quantized transform coefficient blocks to GPU 224. In doing so, dequantization and IDCT component 260 can achieve the same output frames without CPU 214 having to unzig-zag the reconstructed quantized transform coefficient blocks.

In further respects, the present disclosure provides for CPU 214 not providing trailing zero-valued coefficients of the reconstructed quantized transform coefficient blocks to GPU 224. For example, using the zig-zagged reconstructed quantized transform coefficient blocks, CPU 214 may provide only the preceding coefficients to GPU 224. The zig-zag ordering maintains the trailing zeros in each coded block. As an example, CPU 214 can identify that the last coefficients in a block are all zero values and refrain from transmitting them to the GPU. Thus, significant bandwidth can be saved in transmitting the transform coefficients to the GPU by exploiting the energy compaction properties of the discrete cosine transform. In the example of the 4×4 quantized transform coefficient block Q describes above, CPU 214 need not transfer the five trailing zero values by filtering them from the coded block. This filtering of zero values may optionally be performed by the program code described above (e.g., the browser-native program code). In some cases, GPU 224 automatically adds the trailing zeros to a transform coefficient block received from CPU 214 (e.g., based on the size of the transform coefficient block by filling in missing trailing coefficients with zero values).

Referring now to FIG. 5, a flow diagram is provided showing an embodiment of a method 500 for video decoding using point sprites. Each block of method 500 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 510, method 500 includes instructing a GPU to load point sprites representing coded blocks of one or more frames encoded in a bitstream. For example, CPU 214 can instruct GPU 224 to load point sprites. 264. In the present example, each of point sprites 264 represents a coded block of one or more frames encoded (e.g., of the same frame) in a bitstream. Each coded block can correspond to a respective portion of an output frame to be generated by GPU 224 and the portions may be non-overlapping. The instructing can be directed by program code received from a server, such as access server 160. For example, the program code can be the browser-native program code described above. Further, the program code may be executed in browser 122 on client device 120, and may be received by client device 120 in response to a request from client device 120 sent over network 140. The request may be, for example, a request to connect to a remote session hosted on server 130.

Access server 160 can send the program code, such as Javascript, to client device 120 based on the request. In other cases, the program code is integrated into browser 122 as a plug-in. The program code can correspond to a remote desktop client or a video streaming player. Where the program code corresponds to a video streaming player, the request could be for a video stream connection that comprises the bitstream. However, the request need not correspond to a request for the connection that provides the bitstream. Instead, the request could be for a separate connection and for a separate purpose, such as to download the program code (e.g., for installation).

CPU 214 can provide the transform coefficients to GPU 224 that are represented by point sprites 264. Furthermore, CPU 214 may not provide trailing zero values from the transform coefficients to GPU 224. This can reduce the bandwidth used to transfer the transform coefficients and increase decoding performance Optionally CPU 214 may have already dequantized the transform coefficients (e.g., as instructed by the program code).

At block 520, method 500 includes instructing the GPU to load a transform kernel texture. For example, CPU 214 can instruct GPU 224 to load a transform kernel as transform kernel texture 266. The instructing can be directed by the program code described above. In some cases, the transform kernel texture is configured to compensate for performing an inverse discrete cosine transform on transform coefficients that have a zig-zag arrangement. Thus, the transform kernel texture can correspond to a modified version of the IDCT basis matrices used to encode the bitstream. In some cases, server 130 generates (optionally) the transform kernel texture by modifying the IDCT basis matrices using the equation described above and provides the transform kernel texture to client device 120 (e.g., in the program code).

At block 530, method 500 includes instructing the GPU to construct an output frame by performing an inverse transform on the point sprites using the transform kernel texture. For example, CPU 214 can instruct GPU 224 to construct an output frame by optionally dequantizing the coded blocks of transform coefficients for each of point sprites 264 and by applying an inverse transform to the coded block of transform coefficients for each of point sprites 264 by transforming point sprites 264 with transform kernel texture 266 (e.g., subsequent to dequantization).

CPU 214 can also instruct GPU 224 to generate offsets for point sprites 264 that map point sprites 264 to corresponding basis matrices in transform kernel texture 266. The instructing can be for GPU 224 to perform the inverse transform at locations of the transform kernel texture 266 that are determined by the offsets.

CPU 214 can instruct GPU 224 to perform an inverse discrete cosine transform on point sprites 264 by transforming point sprites 264 with transform kernel texture 266. In doing so, GPU 224 can construct an output frame and display the output frame on client device 120 using presentation components 216. As examples, the output frame can be generated using intra-prediction or inter-prediction. Method 500 can similarly operate on each coded block of frame encoded in the bitstream to generate each output frame of the bitstream. It is noted, each block of method 500 can be accomplished by CPU 214 providing one or more instructions to GPU 224, such as API instructions (e.g., a WebGL API).

Referring now to FIG. 6, a flow diagram is provided showing one embodiment of a method 600 for video decoding using point sprites. At block 610, method 600 includes loading point sprites representing coded blocks of one or more frames encoded in a bitstream. For example, GPU 224 can load point sprites 264 that each represent a coded block of transform coefficients of one or more frames encoded in a bitstream into GPU memory 230.

At block 620, method 600 includes loading a transform kernel texture. For example, GPU 224 can load transform kernel texture 266 into GPU memory 230. Transform kernel texture 266 may be received for loading from CPU 214 (e.g., directed by the program code).

At block 630, method 600 includes constructing an output frame by performing an inverse transform on the point sprites using the transform kernel texture. For example, dequantization and IDCT component 260 can construct an output frame by optionally dequantizing the coded blocks of transform coefficients for each of point sprites 264 and by applying an inverse transform to the coded block of transform coefficients for each of point sprites 264 by transforming point sprites 264 with transform kernel texture 266.

Dequantization and IDCT component 260 of GPU 224 can receive, from vector processing unit 232, point sprites 264 storing the blocks of transform coefficients with their corresponding offsets. This can be performed by GPU 224 performing rasterization in which fragment processing unit 234 uses the offsets and memory addresses prepared by vector processing unit 232. The rasterization formula can perform the inverse transform on the transform coefficients. In doing so, at least the inverse transform can be applied to each of the coded blocks of transform coefficients for each of point sprites 264 in parallel by GPU 224. In particular, the parallel processing capabilities of the rasterization pipeline of GPU 224 can be employed. In the same render pass, or a preceding render pass, dequantization and IDCT component 260 can also dequantize the coded block of transform coefficients. GPU 224 can present output frames constructed using method 600 on client device 120, by way of example.

Figure 7:
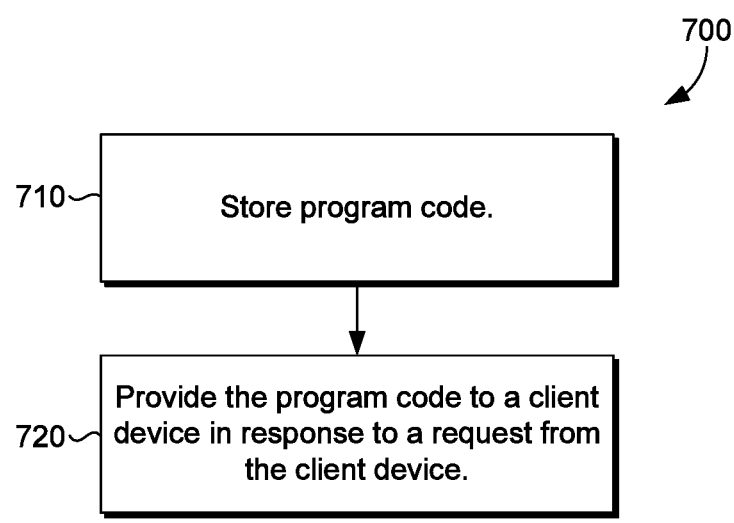
FIG. 7 is a flow diagram showing a method for video decoding using point sprites in accordance with embodiments of the present disclosure.

Referring now to FIG. 7, a flow diagram is provided showing one embodiment of a method 700 for video decoding using point sprites. At block 710, method 700 includes storing program code. For example, access server 160, server 130, and/or another server can store the program code described above (e.g., the browser-native program code or other code corresponding to a RD client or video streaming client).

At block 720, method 700 includes providing the program code to a client device in response to a request from the client device. For example, the server can provide the program code to client device 120 in response to a request from the client device over network 140. The request can be, for example, to establish a connection to a remote session hosted on server 130, or another type of request, examples of which have been described above. The program code may include transform kernel texture 266 or is may be provided and/or stored separately.

As can be understood, implementations of the present disclosure provide for video decoding using point sprites. The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method comprising:
    instructing a graphics processor unit (GPU) to load a plurality of point sprites, each point sprite representing a coded block of transform coefficients of one or more frames encoded in a bitstream;
    instructing the GPU to load a transform kernel as a transform kernel texture;
    instructing the GPU to generate offsets for the plurality of point sprites, the offsets mapping the plurality of point sprites to corresponding basis matrices in the transform kernel texture; and
    instructing the GPU to construct an output frame by applying an inverse transform, for each of the plurality of point sprites, to the coded block of transform coefficients represented by the point sprite by transforming the point sprite with the loaded transform kernel texture at a location of the loaded transform kernel texture determined by a corresponding offset of the offsets generated by the GPU.

2. The computer-implemented method of claim 1, wherein the coded block of transform coefficients for each of the plurality of point sprites has a zig-zag arrangement and the transform kernel texture is configured to compensate for the zig-zag arrangement in the inverse transform.

3. The computer-implemented method of claim 1, further comprising:
generating the coded block of transform coefficients for each of the plurality of point sprites from the bitstream; and
providing the coded block of transform coefficients for each of the plurality of point sprites for the GPU to load based on the instructing of the GPU to load the plurality of point sprites, wherein trailing zero value coefficients are omitted from being provided to the GPU for each of the plurality of point sprites.

4. The computer-implemented method of claim 1, further comprising:
dequantizing the coded block of transform coefficients for each of the plurality of point sprites; and
providing the dequantized coded block of transform coefficients for each of the plurality of point sprites for the GPU to load based on the instructing of the GPU to load the plurality of point sprites.

5. The computer-implemented method of claim 1, further comprising providing the transform kernel to the GPU to load based on the instructing of the GPU to load the transform kernel.

6. The computer-implemented method of claim 1, wherein the plurality of point sprites correspond to respective and non-overlapping portions of the output frame.

7. The computer-implemented method of claim 1, wherein the instructing the GPU to generate offsets for the plurality of point sprites includes instructing a vector processing unit of the GPU to generate the offsets.

8. The computer-implemented method of claim 1, further comprising:
receiving the bitstream over a connection by a remote desktop client to a remote session; and
presenting the output frame in the remote desktop client.

9. The computer-implemented method of claim 1, wherein the output frame is generated using one of intra-prediction or inter-prediction, and the plurality of point sprites represent residual data used for motion compensation.

10. One or more computer-readable storage media having a plurality of executable instructions embodied thereon, which, when executed by one or more processors, cause a graphical processing unit (GPU) to perform a method comprising:
loading a plurality of point sprites that each represent a coded block of transform coefficients of one or more frames encoded in a bitstream;
loading a transform kernel as a transform kernel texture;
generating offsets for the plurality of point sprites, the offsets mapping the plurality of point sprites to corresponding basis matrices in the transform kernel texture; and
constructing an output frame, the constructing comprising applying an inverse transform, for each of the plurality of point sprites, to the coded block of transform coefficients represented by the point sprite by transforming the point sprite with the loaded transform kernel texture at a location of the loaded transform kernel texture determined by a corresponding offset of the offsets.

11. The one or more computer-readable storage media of claim 10, wherein at least the inverse transform is applied to the coded block of the transform coefficients for each of the plurality of point sprites in parallel by the GPU.

12. The one or more computer-readable storage media of claim 10, wherein the constructing of the output frame further comprises dequantizing for each of the plurality of point sprites, the coded block of transform coefficients represented by the point sprite, wherein the dequantizing is performed and the inverse transform is applied for each of the plurality of point sprites in a single render pass.

13. The one or more computer-readable storage media of claim 10, wherein the constructing of the output frame is further by dequantizing for each of the plurality of point sprites, the coded block of transform coefficients represented by the point sprite, wherein the dequantizing is applied for each of the plurality of point sprites in a first render pass and the inverse transform for each of the plurality of point sprites is performed in a second render pass.

14. The one or more computer-readable storage media of claim 10, further:
comprising dequantizing the coded block of transform coefficients for each of the plurality of point sprites; and
providing the dequantized coded block of transform coefficients for each of the plurality of point sprites for the GPU to load based on the instructing of the GPU to load the plurality of point sprites.

15. The one or more computer-readable storage media of claim 10, wherein the inverse transform is applied to the coded block of transform coefficients for each of the plurality of point sprites in a packed manner.

16. The one or more computer-readable storage media of claim 10, wherein the inverse transform is applied to the coded block of transform coefficients for each of the plurality of point sprites in a unpacked manner.

17. A computer-implemented system comprising:
a server storing program code, which, when executed by a central processing unit (CPU) on a client device:
instructs a graphics processor unit (GPU) to load a plurality of point sprites, each point sprite representing a coded block of transform coefficients of one or more frames encoded in a bitstream;
instructs the GPU to load a transform kernel as a transform kernel texture;
instructs the GPU to generate offsets for the plurality of point sprites, the offsets mapping the plurality of point sprites to corresponding basis matrices in the transform kernel texture; and
instructs the GPU to construct an output frame by applying an inverse transform, for each of the plurality of point sprites, to the coded block of transform coefficients represented by the point sprite by transforming the point sprite with the loaded transform kernel texture at a location of the loaded transform kernel texture determined by a corresponding offset of the offsets;
the server programmed to provide the stored program code to the client device in response to a request from the client device over a computer network.

18. The computer-implemented system of claim 17, wherein the program code effectuates a remote desktop client connected to a remote session, and the output frame is of a computer desktop of the remote session.

19. The computer-implemented system of claim 17, comprising one or more computer-readable media having a plurality of executable instructions embodied thereon, which, when executed by one or more processors, causes the one or more processors to provide the bitstream comprising graphical user interface (GUI) data of a remote session to the client device.

20. The computer-implemented system of claim 17, wherein the program code comprises browser-native program code that instructs a web browser on the client device to decode the bitstream using the browser-native program code to generate an output frame and to display the output frame.

* * * * *